United States Patent
Berglund et al.

(10) Patent No.: US 10,694,673 B2
(45) Date of Patent: Jun. 30, 2020

(54) LAWN MOWER INCLUDING AN INCLINED BLOWER

(71) Applicant: Ariens Company, Brillion, WI (US)

(72) Inventors: Brent P. Berglund, Brillion, WI (US); Matthew P. Schuller-Rach, Kaukauna, WI (US)

(73) Assignee: Ariens Company, Brillion, WI (US)

( * ) Notice: Subject to any disclaimer, the term of this patent is extended or adjusted under 35 U.S.C. 154(b) by 266 days.

(21) Appl. No.: 15/920,101

(22) Filed: Mar. 13, 2018

(65) Prior Publication Data

US 2018/0255708 A1 Sep. 13, 2018

Related U.S. Application Data

(60) Provisional application No. 62/470,638, filed on Mar. 13, 2017.

(51) Int. Cl.
| | |
|---|---|
| *A01D 43/00* | (2006.01) |
| *A01D 43/077* | (2006.01) |
| *A01D 34/66* | (2006.01) |
| *A01D 43/063* | (2006.01) |
| *A01D 34/71* | (2006.01) |
| *A01D 101/00* | (2006.01) |

(52) U.S. Cl.
CPC .......... *A01D 43/077* (2013.01); *A01D 34/66* (2013.01); *A01D 34/71* (2013.01); *A01D 43/063* (2013.01); *A01D 2101/00* (2013.01)

(58) Field of Classification Search
CPC .... A01D 43/077; A01D 43/063; A01D 34/63; A01D 34/66; A01D 34/71; A01D 42/005
USPC ............... 56/10.7, 13.3, 16.6, 202, 320.2
See application file for complete search history.

(56) References Cited

U.S. PATENT DOCUMENTS

| | | | | |
|---|---|---|---|---|
| 4,700,534 | A | * 10/1987 | Reilly | ................. A01D 43/077 56/10.7 |
| 4,735,037 | A | 4/1988 | Benter | |
| 4,996,829 | A | * 3/1991 | Saitoh | ................. A01D 43/077 56/13.3 |

(Continued)

FOREIGN PATENT DOCUMENTS

EP    2740344 A2    11/2014

OTHER PUBLICATIONS

Exmark Ultra Vac Operator's Manual, Exmark Mfg. Co. Inc. 2000-2004 (32 pages).

(Continued)

*Primary Examiner* — Robert E Pezzuto
(74) *Attorney, Agent, or Firm* — Michael Best & Friedrich LLP

(57) ABSTRACT

A lawn mower including a frame, a prime mover supported by the frame, a plurality of wheels rotatably coupled to the frame to support the frame for movement along the ground, and a cutting deck supported by the frame. The cutting deck has a discharge opening. The lawn mower also includes a cutting blade rotatably mounted below the cutting deck and driven by the prime mover. The cutting blade is rotatable within a cutting plane. The lawn mower further includes a blower supported by the cutting deck adjacent the discharge opening to draw cut vegetation from under the cutting deck and discharge the cut vegetation away from the cutting deck. The blower is obliquely angled relative to the cutting plane.

25 Claims, 15 Drawing Sheets

(56) References Cited

U.S. PATENT DOCUMENTS

| | | | |
|---|---|---|---|
| 5,020,309 A | * | 6/1991 | Hopkins .............. A01D 42/005 15/330 |
| 5,062,258 A | | 11/1991 | Samejima et al. |
| 5,224,327 A | | 7/1993 | Minoura et al. |
| 5,669,211 A | | 9/1997 | Bening et al. |
| 5,746,045 A | | 5/1998 | Haney |
| 5,873,225 A | | 2/1999 | Schaedler et al. |
| 6,073,430 A | | 6/2000 | Mullet et al. |
| 6,226,970 B1 | | 5/2001 | Busboom et al. |
| 6,854,249 B1 | | 2/2005 | Samejima et al. |
| 7,069,712 B2 | | 7/2006 | Bauer et al. |
| 7,383,678 B2 | | 6/2008 | Buss et al. |
| 8,156,722 B2 | | 4/2012 | Sugio et al. |
| 8,579,058 B1 | | 11/2013 | Yamada et al. |
| 2013/0276254 A1 | | 10/2013 | Norton et al. |
| 2015/0033693 A1 | | 2/2015 | Ito et al. |
| 2015/0190021 A1 | | 7/2015 | Barkow et al. |
| 2016/0212937 A1 | | 7/2016 | Walden |

OTHER PUBLICATIONS

Image of PECO Blower, 2012 (1 page).
"PRO12 Dump From Seat" PECO Lawnvac Website: https://www.lawnvac.com/ Copyright 2011-2017 (2 pages).
"Humboldt Specialty" Manufacturing Company Lawn Website: http://www.humboldtspecialty.com/lawn-garden/webpage available before Mar. 13, 2018 (2 pages).

* cited by examiner

LAWN MOWER INCLUDING AN INCLINED BLOWER

CROSS-REFERENCE TO RELATED APPLICATIONS

This application claims benefit to prior filed, co-pending U.S. Provisional Patent Application No. 62/470,638, filed Mar. 13, 2017, the entire contents of which are incorporated by reference herein.

FIELD OF THE INVENTION

The present invention relates to yard machines and, more particularly, to grass collection blowers for lawn mowers or lawn vacuums.

SUMMARY

In one embodiment, the invention provides a lawn mower including a frame, a prime mover supported by the frame, a plurality of wheels rotatably coupled to the frame to support the frame for movement along the ground, and a cutting deck supported by the frame. The cutting deck has a discharge opening. The lawn mower also includes a cutting blade rotatably mounted below the cutting deck and driven by the prime mover. The cutting blade is rotatable within a cutting plane. The lawn mower further includes a blower supported by the cutting deck adjacent the discharge opening to draw cut vegetation from under the cutting deck and discharge the cut vegetation away from the cutting deck. The blower is obliquely angled relative to the cutting plane.

In another embodiment, the invention provides a lawn mower including a frame, a prime mover supported by the frame, a plurality of wheels rotatably coupled to the frame to support the frame for movement along the ground, and a cutting deck supported by the frame. The cutting deck has a discharge opening. The lawn mower also includes a cutting blade rotatably mounted below the cutting deck and driven by the prime mover. The cutting blade is rotatable within a cutting plane. The lawn mower further includes a bracket having a first end mounted atop the cutting deck and a second end being cantilevered from the cutting deck such that the second end is outside the outer periphery of the cutting deck. The lawn mower further includes a blower positioned adjacent the discharge opening of the cutting deck to draw cut vegetation from under the cutting deck and discharge the cut vegetation away from the cutting deck. The blower including an impeller mounted to the second end of the bracket, and a housing assembly mounted to the bracket and surrounding the impeller such that the impeller does not rely on the housing assembly for support.

In yet another embodiment, the invention provides a collection system for use with a lawn mower including a frame, a cutting deck supported by the frame, a discharge opening defined in the cutting deck, and a cutting blade rotatably mounted below the cutting deck, wherein the cutting blade is rotatable within a cutting plane. The collection system includes a blower configured to be mounted to the cutting deck adjacent the discharge opening. The blower includes a housing having an inlet and an outlet and an impeller positioned within the housing and defining an axis of rotation about which the impeller rotates. The axis of rotation is configured to be obliquely angled relative to the cutting plane of the cutting blade when the blower is mounted to the cutting deck. The collection system further includes a collection unit configured to be coupled to the frame and a conduit extending from the blower to the collection unit to direct the cut vegetation to the collection unit. The collection unit is configured to collect vegetation cut by the cutting blade.

Still, in yet another embodiment, the invention provides a blower for use with a lawn mower including a frame, a cutting deck supported by the frame, a discharge opening defined in the cutting deck, and a cutting blade rotatably mounted below the cutting deck, wherein the cutting blade is rotatable within a cutting plane. The blower includes a housing having a central inlet and an outlet, an impeller positioned within the housing and defining an axis of rotation about which the impeller rotates, and a bracket configured to mount to the cutting deck. The axis of rotation is aligned with the central inlet and configured to be oriented at an oblique angle relative to the cutting plane of the cutting blade. The bracket supports the impeller at the oblique angle relative to the cutting plane.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
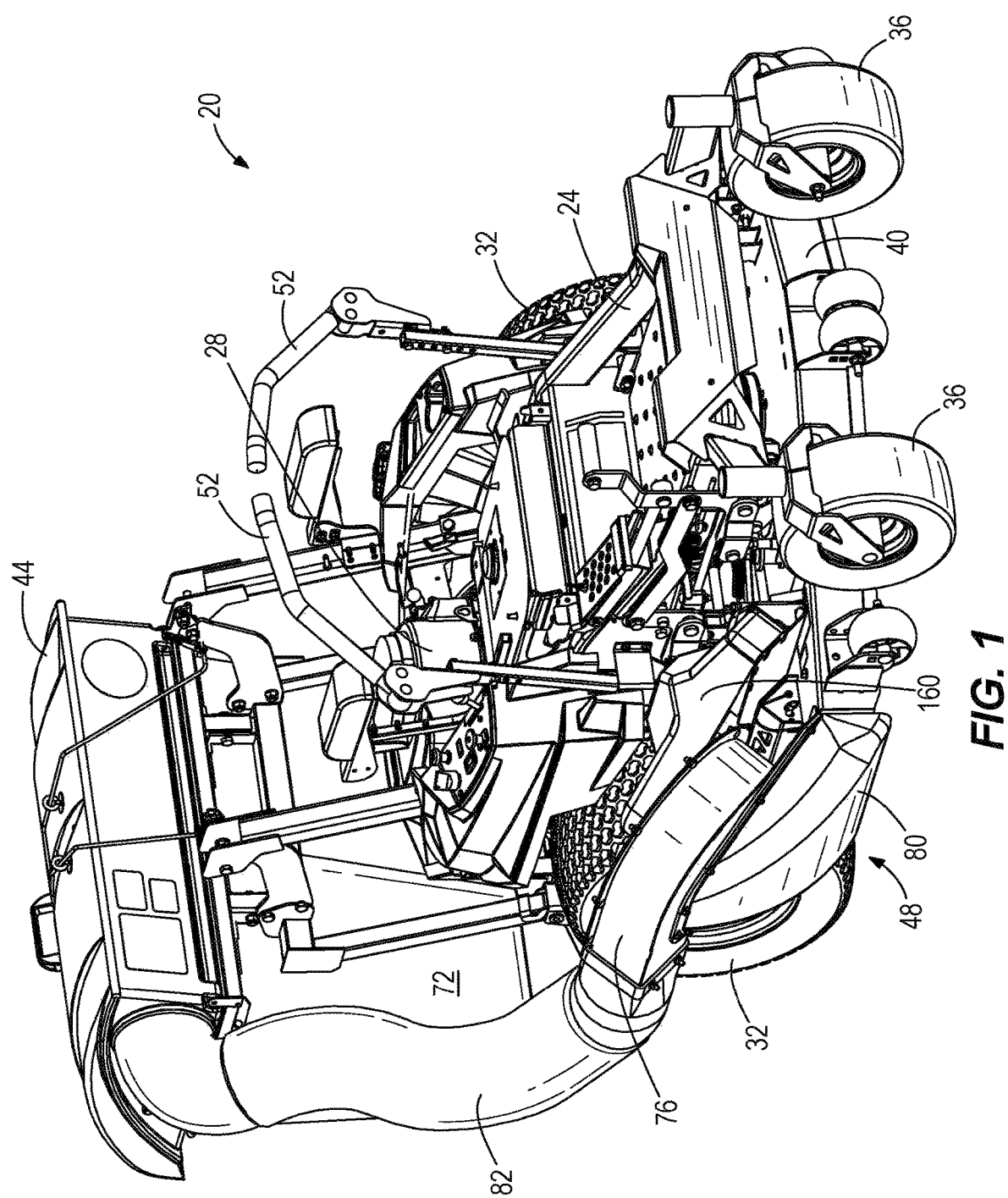
FIG. 1 is a perspective view of a lawn mower including a blower embodying the invention.
Figure 2:
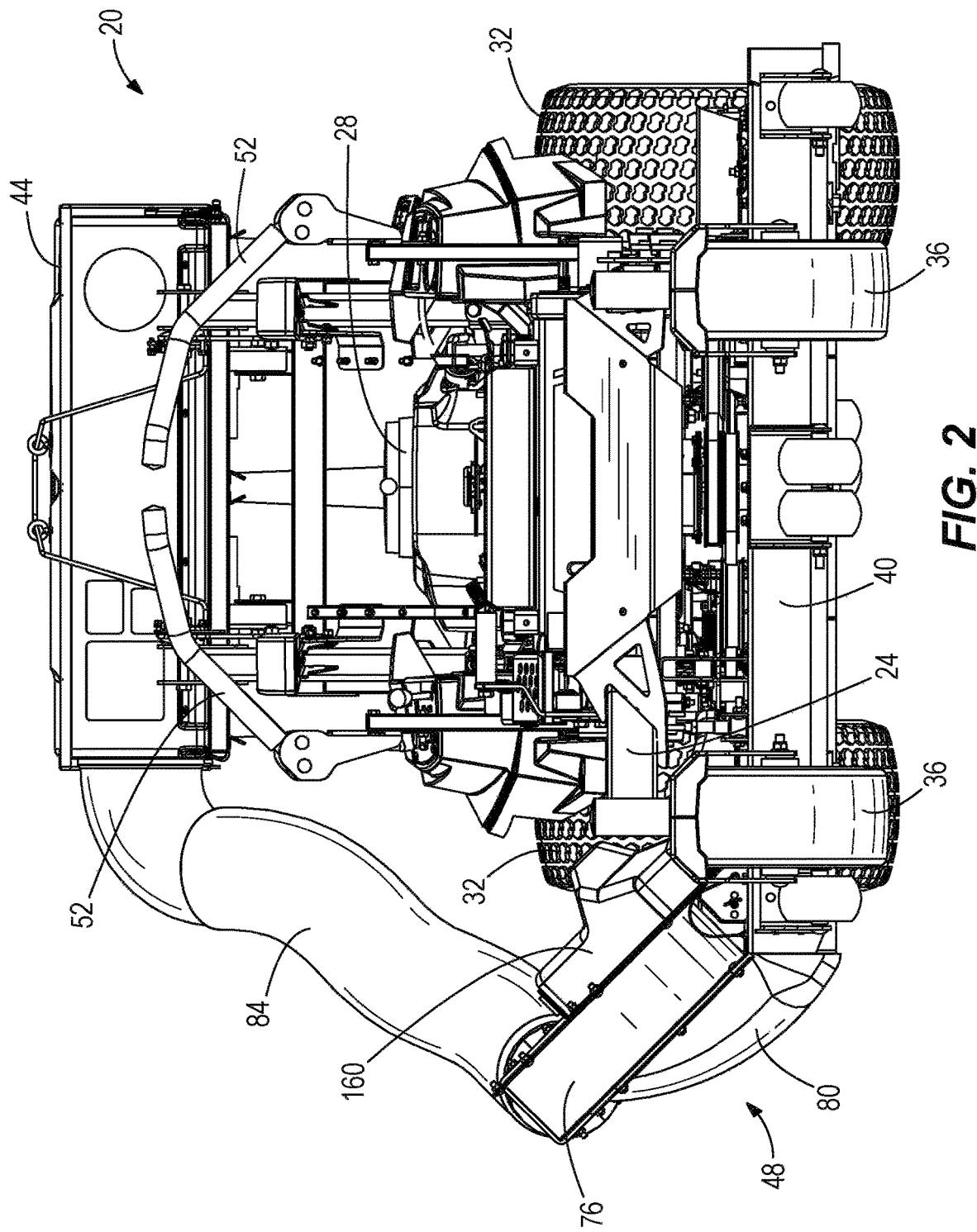
FIG. 2 is a front view of the lawn mower.
Figure 3:
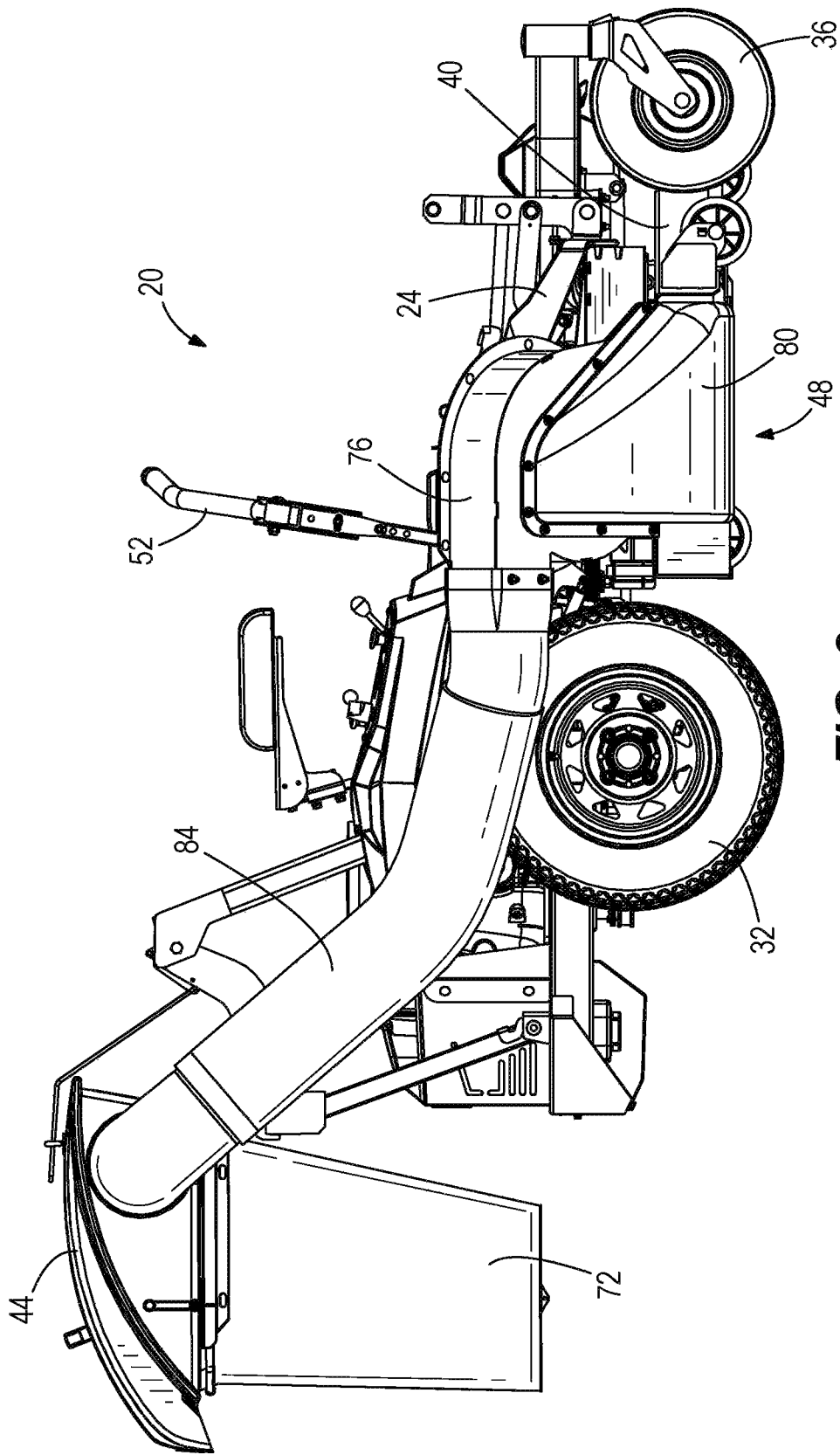
FIG. 3 is a side view of the lawn mower.

FIGS. 1-3 illustrate a lawn mower 20 including a frame 24, a prime mover 28, two driven wheels 32, two passive wheels 36, a cutting deck 40, and a collection unit 44. The illustrated lawn mower 20 also includes a blower assembly 48 to direct cut vegetation from under the cutting deck 40 into the collection unit 44. The frame 24 is supported over the ground by the driven wheels 32 and the passive wheels 36, and in turn supports the other components of the lawn mower 20. The prime mover 28 is supported adjacent a rear of the frame 24. The illustrated prime mover 28 includes a gasoline powered internal combustion engine. In other embodiments, the prime mover 28 may include an electric motor, a hybrid gas/electric motor, a fuel cell, or any other suitable device operating on a suitable fuel.

The driven wheels 32 are rotatably coupled to the rear of the frame 24 behind the cutting deck 40. The driven wheels 32 are interconnected with and driven by the prime mover 28. In some embodiments, the driven wheels 32 may be interconnected with the prime mover 28 through hydrostatic transmissions. The operating speeds and directions of the hydrostatic transmissions, and thereby of the driven wheels 32, are controlled by two control arms 52. In the illustrated embodiment, the lawn mower 20 is a riding lawn mower in which an operator sits in a seat (now shown) located between the control arms 52. The lawn mower 20 may be referred to as a zero-turn-radius (ZTR) lawn mower because when one control arm 52 is pressed forward and other control arm 52 is pulled rearward, the lawn mower 20 will move in a relatively tight radius owing to one wheel 32 rotating forward and other wheel 32 rotating backwards. In other embodiments, the lawn mower 20 may be a stand-on lawn mower or a walk-behind lawn mower. Additionally or alternatively, the lawn mower 20 may have other types of controls (e.g., a steering wheel) to control the driven wheels 32.

The passive wheels 36 are rotatably coupled to a front of the frame 24 in front of the cutting deck 40. The illustrated passive wheels 36 are caster wheels that help support and steer the frame 24 over the ground. In other embodiments, the passive wheels 36 may also be interconnected with and driven by the prime mover 28 such that the lawn mower 20 is a four-wheel drive lawn mower. In further embodiments, one or both of the passive wheels 36 may be omitted.

Figure 4:
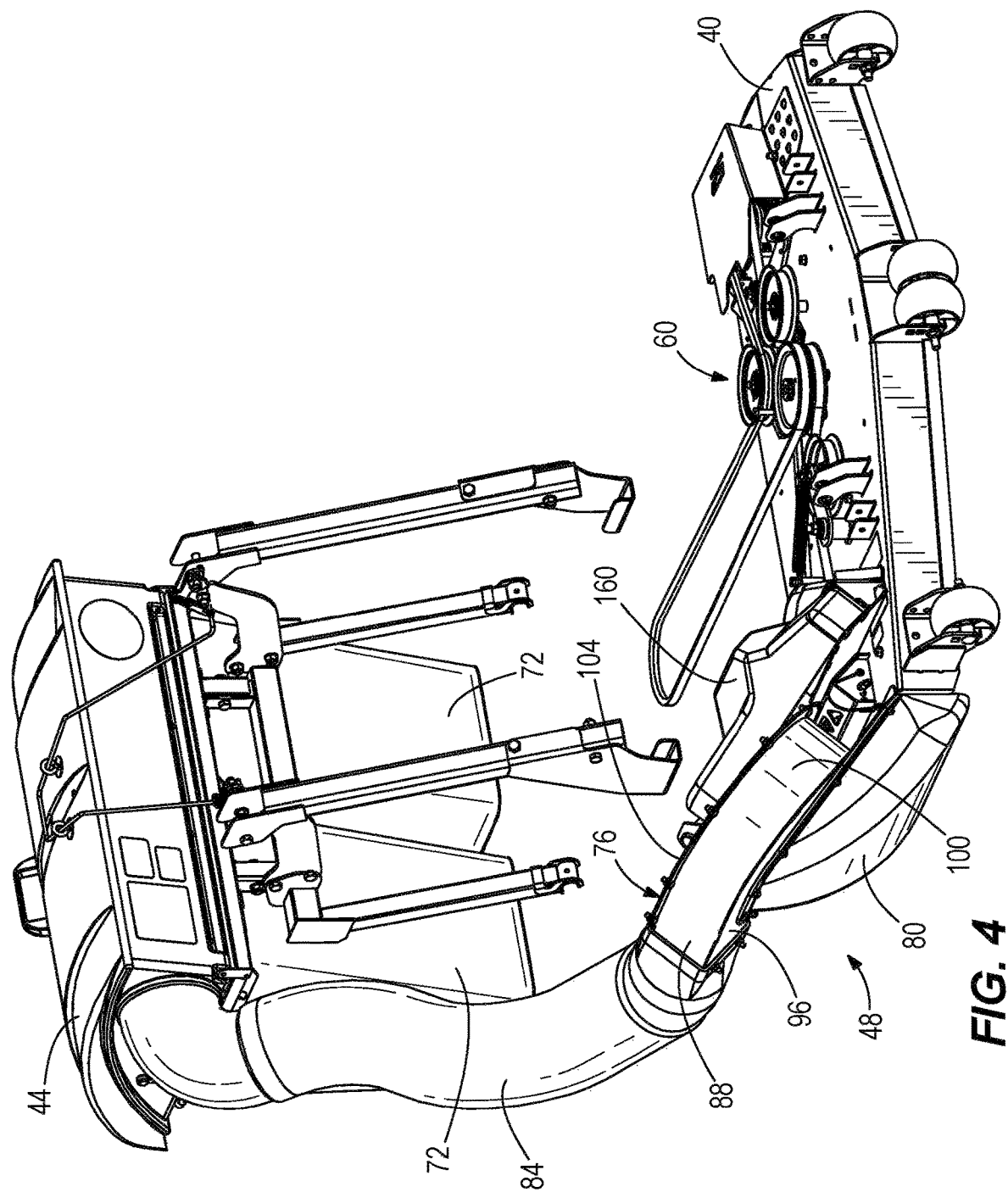
FIG. 4 is a perspective view of a portion of the lawn mower, including the blower, a cutting deck, and a collection unit.
Figure 5:
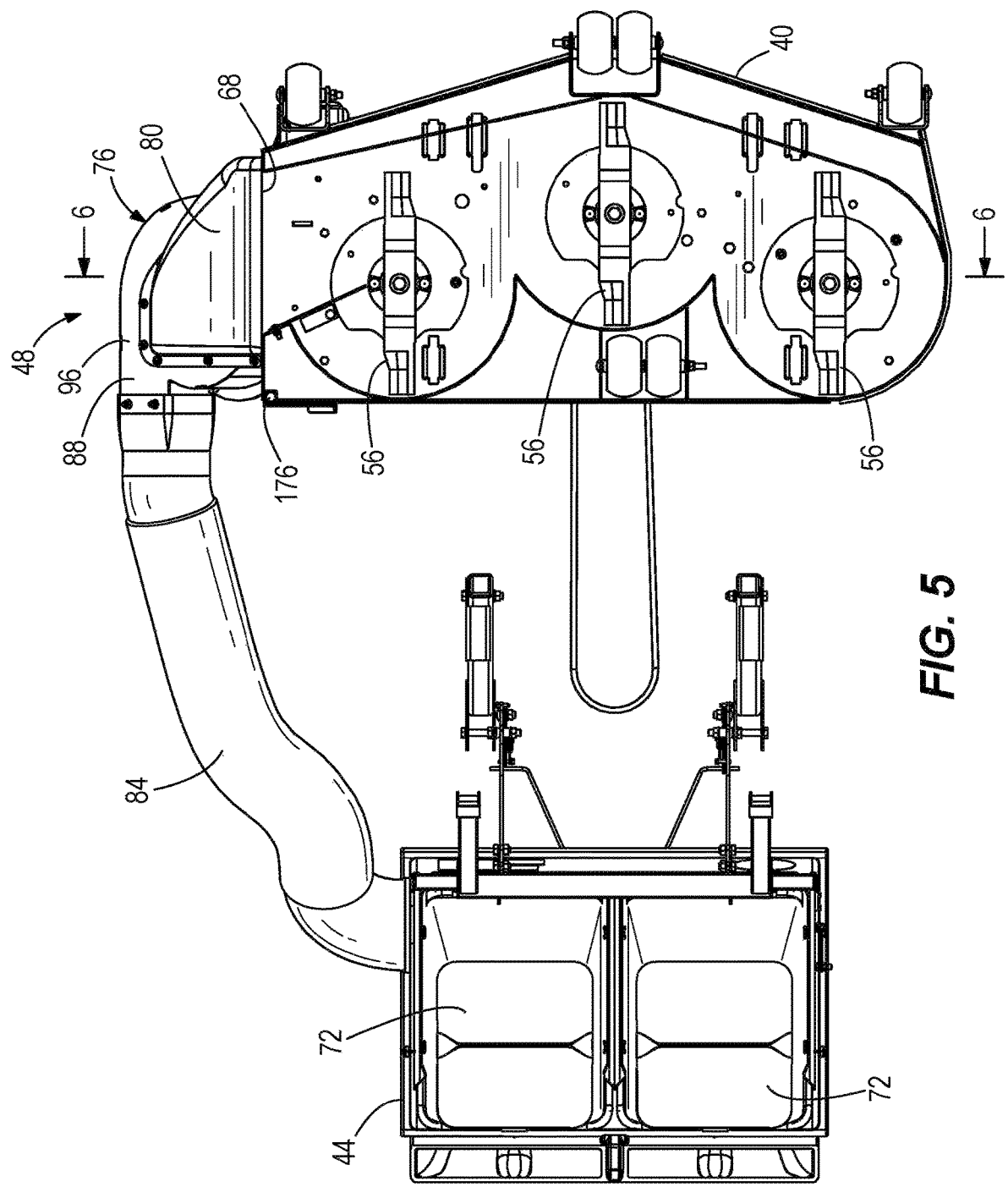
FIG. 5 is a bottom view of the blower, the cutting deck, and the collection unit.
Figure 6:
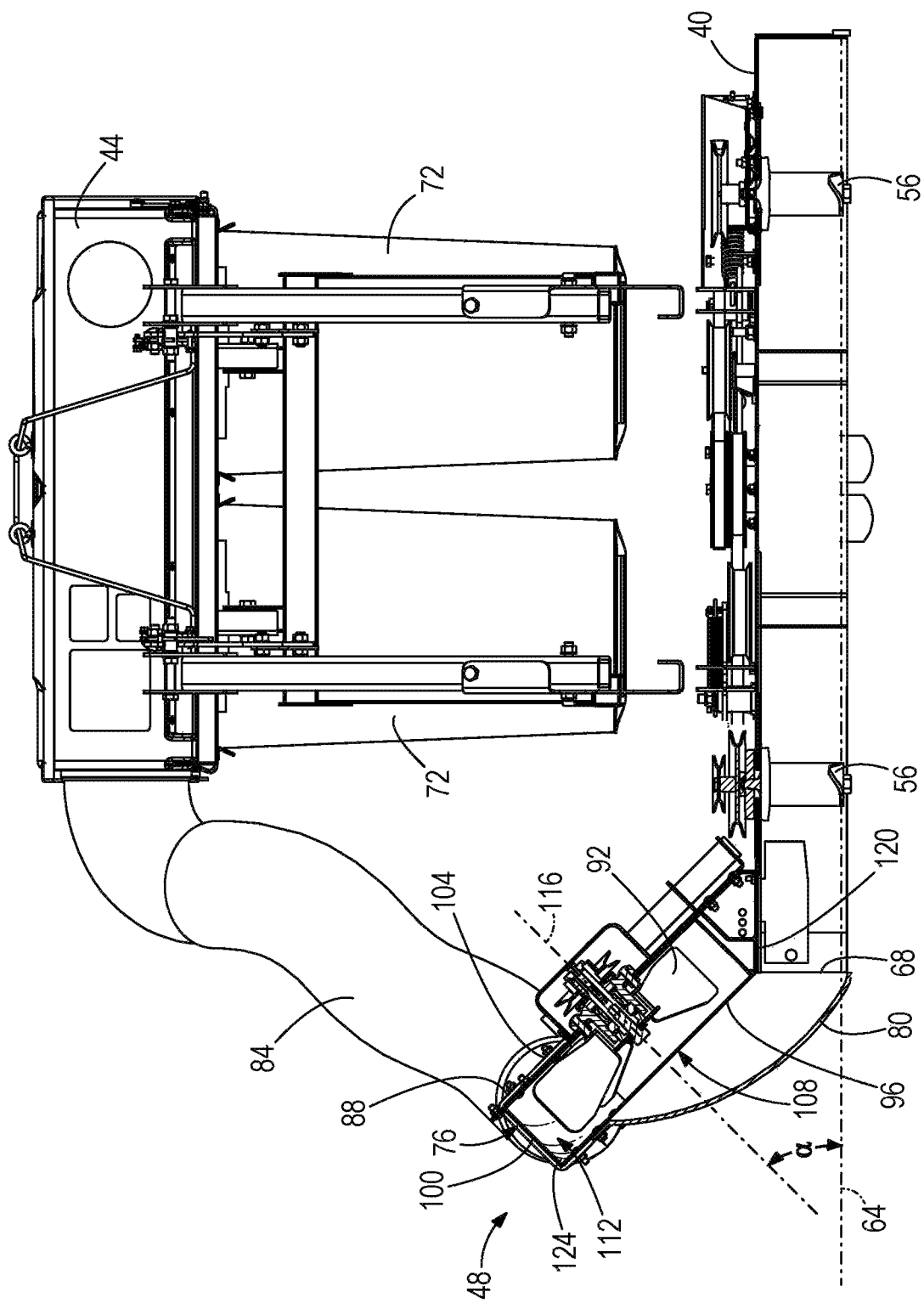
FIG. 6 is a cross-sectional view of the blower, the cutting deck, and the collection unit taken along section line 6-6 of FIG. 5.
Figure 7:
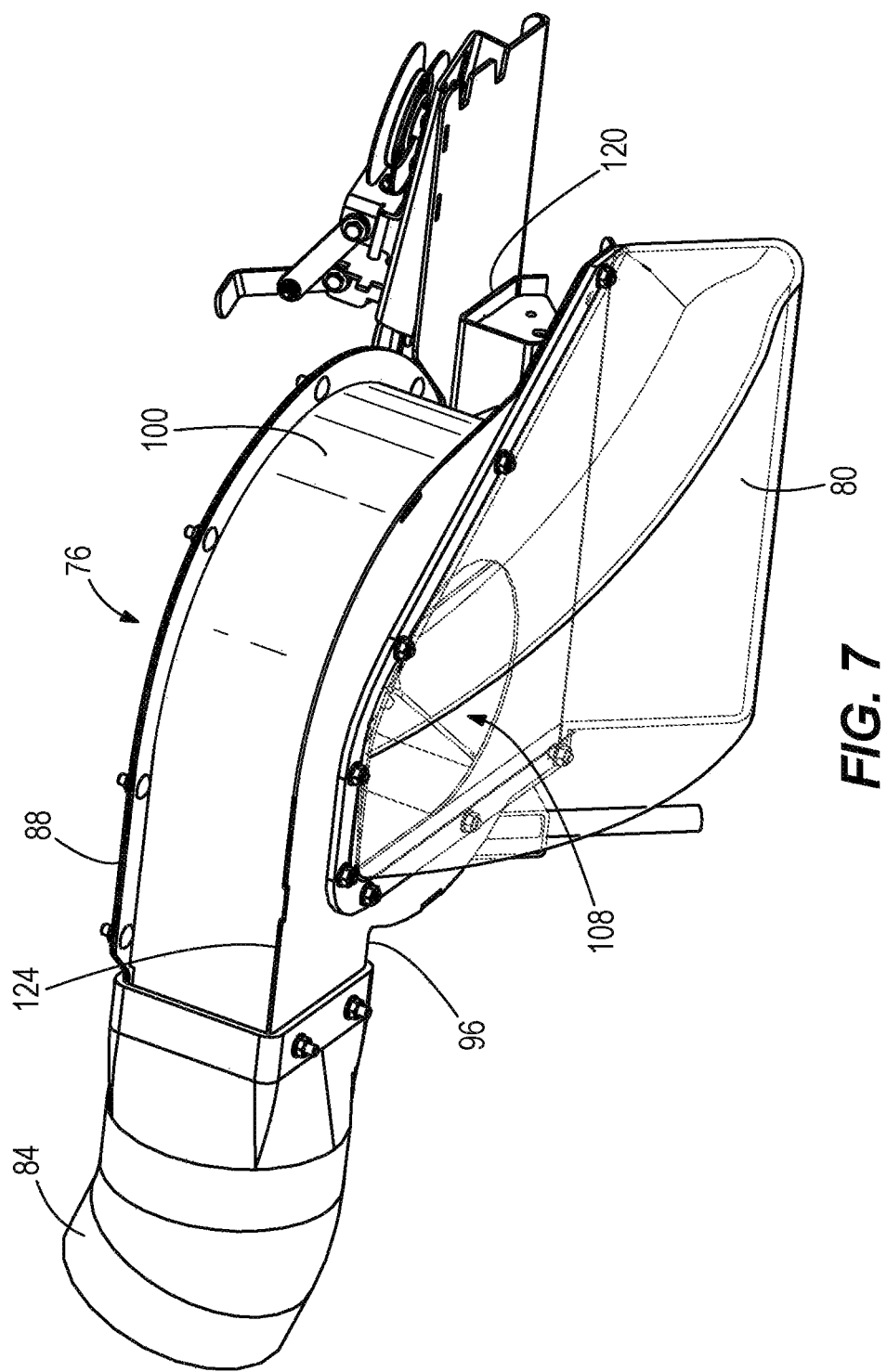
FIG. 7 is a perspective view of the blower.

The cutting deck 40 is supported by the frame 24 between the driven wheels 32 and the passive wheels 36. In the illustrated embodiment, the cutting deck 40 supports three cutting blades 56 (FIG. 5). The illustrated cutting blades 56 are interconnected with the prime mover 28 through a belt drive arrangement 60 (FIG. 4). In other embodiments, the cutting blades 56 may be coupled to the prime mover 28 through other suitable drive means, or may be driven by a separate prime mover. The cutting blades 56 are rotatable relative to the cutting deck 40 to cut grass and other vegetation underneath the cutting deck 40. As shown in FIG. 6, the cutting blades 56 are rotatable within a cutting plane 64. In other embodiments, the lawn mower 20 may include a single cutting blade, two cutting blades, or more than three cutting blades supported under the cutting deck 40.

With continued reference to FIGS. 5 and 6, the cutting deck 40 includes a discharge opening 68. The illustrated discharge opening 68 is formed in a side of the cutting deck 40, between the driven wheels 32 and the passive wheels 36. The discharge opening 68 is configured to direct cut vegetation from under the cutting deck 40 out the side of the cutting deck 40. In some embodiments, the height of the cutting deck 40 relative to the ground and the frame 24 may be adjustable.

As shown in FIGS. 1 and 3, the collection unit 44 is mounted to the rear of the frame 24 and extends behind the driven wheels 32. In some embodiments, the collection unit 44 may be removably mounted to the frame 24, and/or the collection unit 44 may be mounted to the frame 24 at a different location. The illustrated collection unit 44 includes two receptacles 72 that are configured to receive the cut vegetation from under the cutting deck 40. In the illustrated embodiment, the receptacles 72 are mesh bags. In other embodiments, other suitable receptacles may also or alternatively be employed. Additionally or alternatively, the collection unit 44 may include fewer or more receptacles 72. In further embodiments, the collection unit 44 may be a pull-behind trailer that is coupled to the frame 24.

Figure 8:
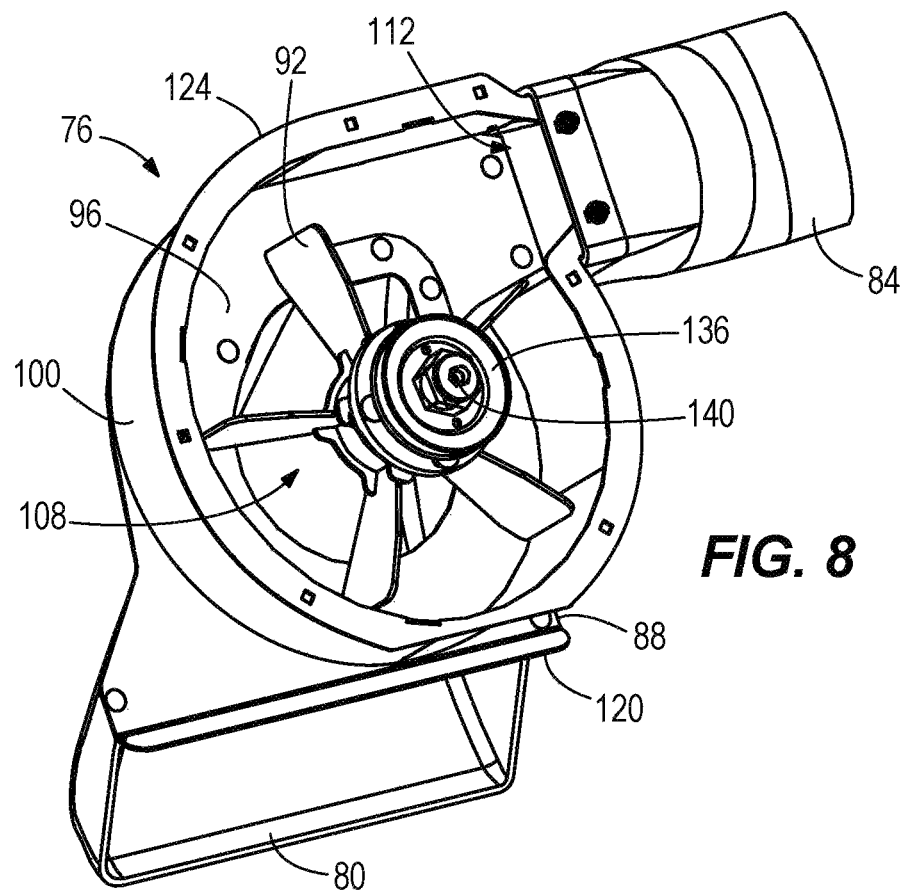
FIG. 8 is a top perspective view of the blower with an upper housing removed.
Figure 9:
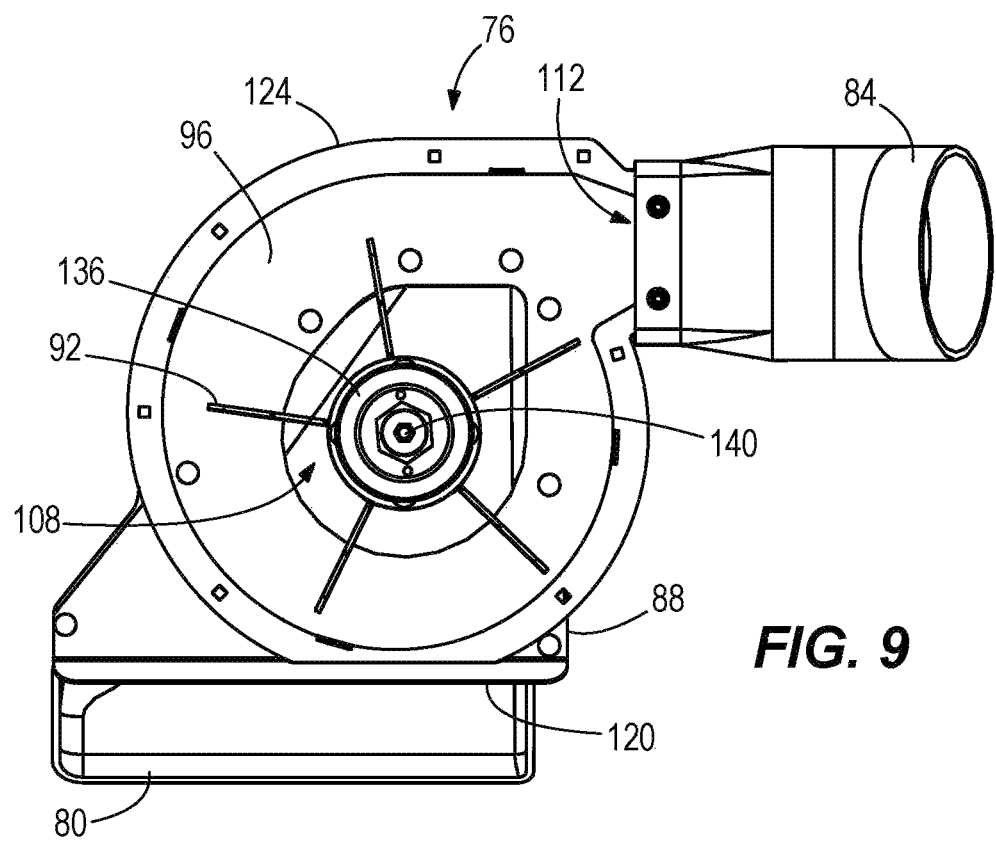
FIG. 9 is a top view of the blower with the upper housing removed.

As shown in FIGS. 4-6, the blower assembly 48 is coupled to the cutting deck 40 and the collection unit 44 to direct cut vegetation from the cutting deck 40 to the collection unit 44. The illustrated blower assembly 48 includes a blower 76, a chute 80, and a conduit 84. The blower 76 is supported by the cutting deck 40 adjacent the discharge opening 68 to draw cut vegetation from under the cutting deck 40. The illustrated blower 76 includes a housing assembly 88 and an impeller 92 (FIGS. 8-9) positioned within the housing assembly 88. The housing assembly 88 is composed of a lower housing 96, a generally cylindrical sidewall 100, and an upper housing 104. The generally cylindrical sidewall 100 defines a scroll-shaped chamber with a changing radius of curvature. In other embodiments, the chamber defined by the sidewall 100 may have a constant radius. In yet another embodiment, the chamber defined by the sidewall 100 may have the general shape of a torus (i.e., donut-shaped). The housing assembly 88 also defines an inlet 108 and an outlet 112 of the blower 76. The inlet 108 is formed in the lower housing 96. The outlet 112 is formed in the sidewall 100. In the illustrated embodiment, the inlet 108 is a central inlet that is aligned with an axis of rotation 116 of the impeller 92. In contrast, the outlet 112 is offset from the axis of rotation 116 and is tangential to the impeller 92.

Figure 10:
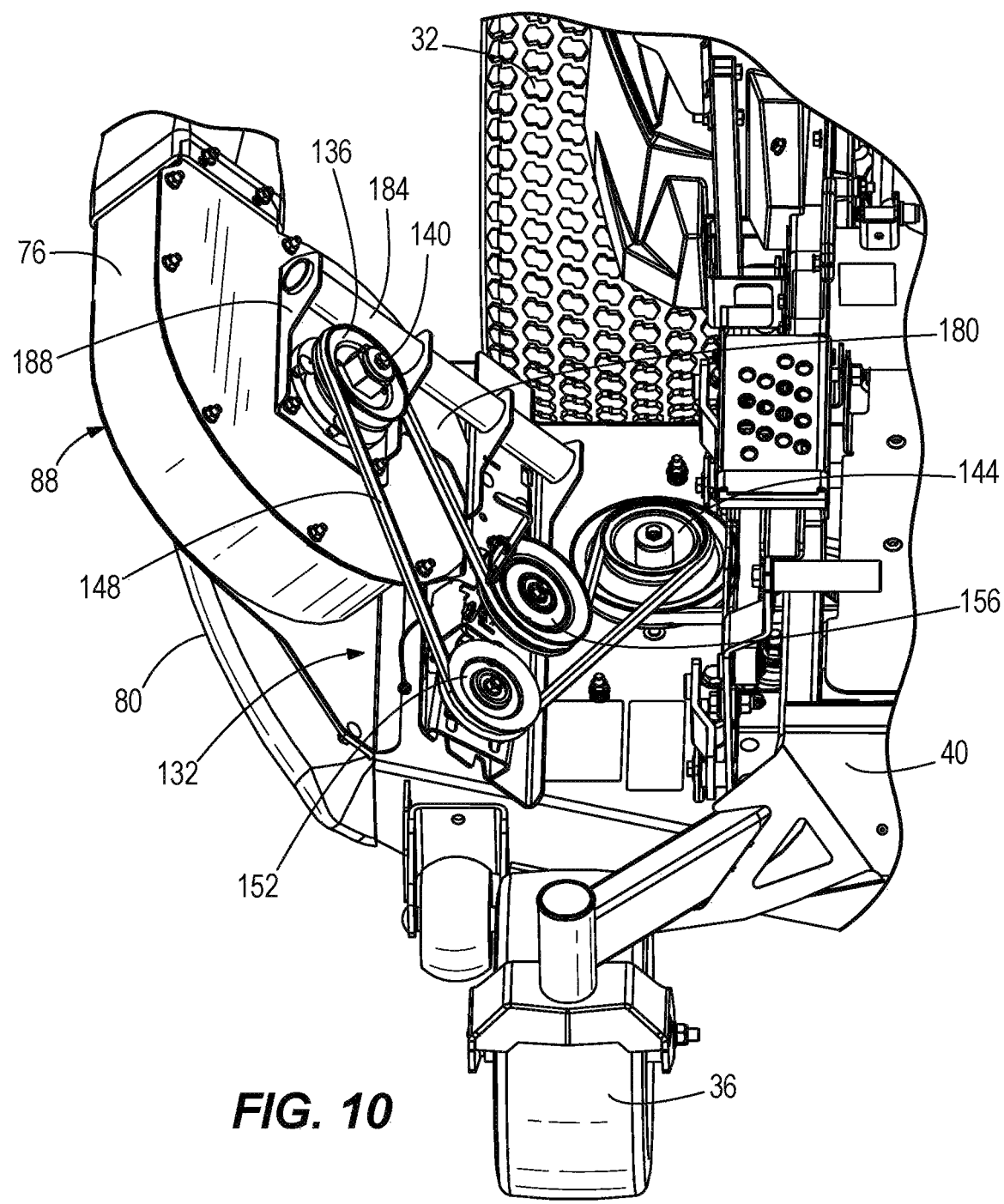
FIG. 10 is a front perspective view of a portion of the lawn mower, illustrating a belt drive arrangement for the blower.
Figure 15:
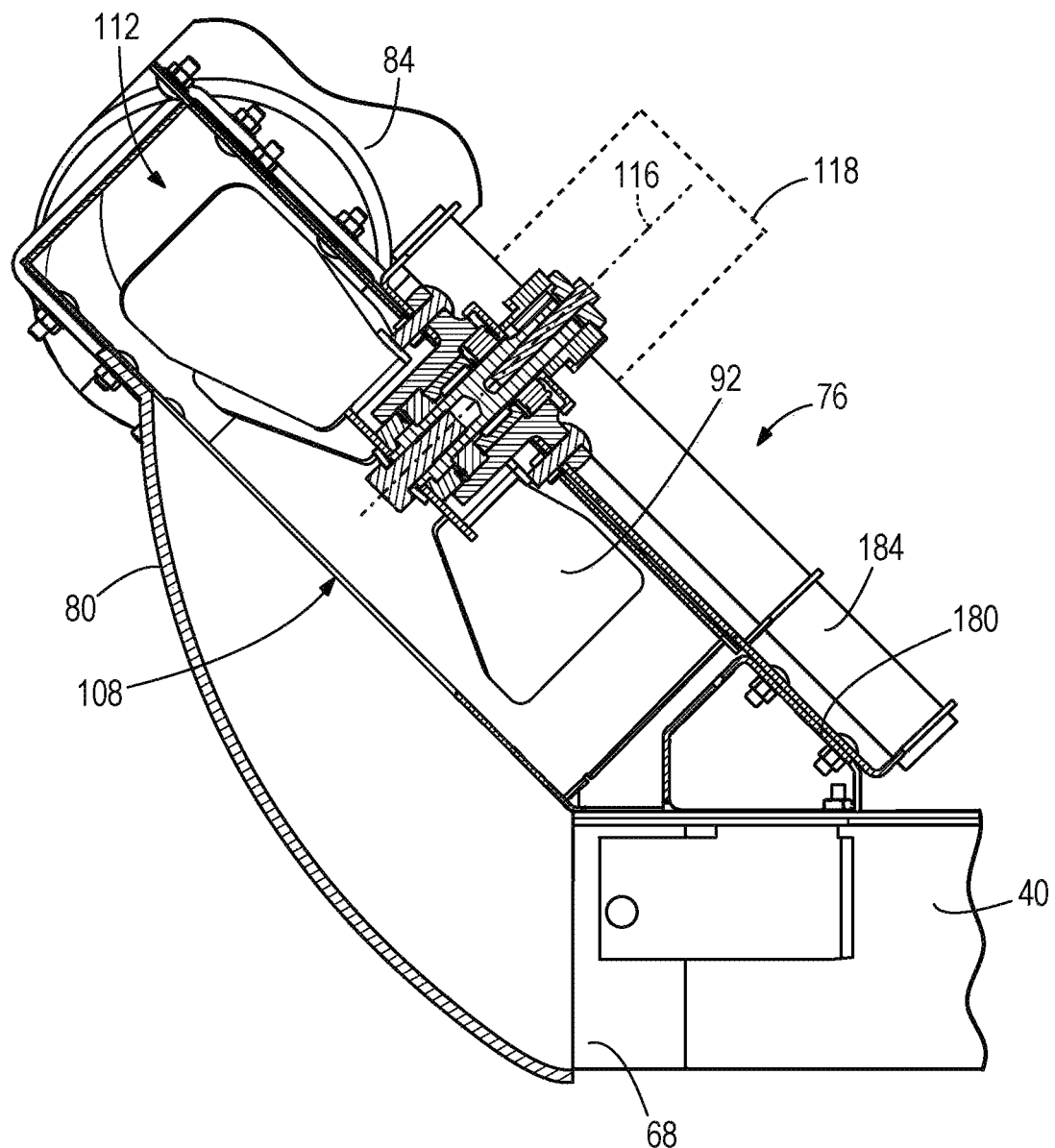
FIG. 15 is a cross-sectional view of a portion of a lawn mower including a blower driven by a separate prime mover.

The impeller 92 rotates about the axis of rotation 116 to draw an airflow, which may include cut vegetation, into the housing assembly 88. The illustrated impeller 92 is interconnected with and driven by the prime mover 28 through, for example, a belt drive arrangement (FIG. 10). In other embodiments, the impeller 92 may be coupled to the prime mover 28 through other suitable drive means. Still, in other embodiments, the impeller 92 may be driven by a separate prime mover 118 (FIG. 15), for example, a separate hydraulic or electric motor. In some embodiments, the impeller 92 may be selectively activated through, for example, actuation of a switch on the lawn mower 20.

In the illustrated embodiment, the blower 76 is inclined relative to the cutting deck 40. More particularly, as shown in FIG. 6, the blower 76 is obliquely angled relative to the cutting plane 64 defined by the cutting blades 56. For example, a proximal edge 120 of the blower 76 (i.e., the edge of the housing assembly 88 nearest the cutting deck 40) is coupled to an upper surface of the cutting deck 40, while a distal edge 124 of the blower 76 (i.e., the edge of the housing assembly 88 furthest from the cutting deck 40) is angled upward from the cutting deck 40. In addition, the axis of rotation 116 of the impeller 92 is obliquely angled relative to the cutting plane 64. In some embodiments, the blower 76 may be angled relative to the cutting plane 64 by an angle α between 15 degrees and 75 degrees. In other embodiments, angle α may be between 30 degrees and 60 degrees. In the illustrated embodiment, the angle α is about 45 degrees.

Referring back to FIGS. 4-6, the chute 80 is coupled to the cutting deck 40 at the discharge opening 68 and is coupled to the lower housing 96 of the blower 76. The chute 80 surrounds the discharge opening 68 and the inlet 108 to form a closed pathway between the cutting deck 40 and the blower 76. The chute 80 directs an airflow, which may include cut vegetation, from the cutting deck 40 to the inlet 108 of the blower 76. As further explained below, an inner surface 128 (FIG. 12) of the chute 80 also forms a ramp to help direct cut vegetation toward the outlet 112 of the blower 76. In the illustrated embodiment, the chute 80 is formed of molded plastic and is shaped to fit between the cutting deck 40 and the blower 76. In other embodiments, the chute 80 may be formed of other suitable materials. In further embodiments, the chute 80 may be integrally formed with or permanently attached to the blower 76.

The conduit 84 extends from the outlet 112 of the blower 76 to an inlet the collection unit 44 to direct cut vegetation to the collection unit 44. In the illustrated embodiment, the conduit 84 is a flexible tube or hose extending between the blower 76 and the collection unit 44. In some embodiments, the conduit 84 may be a relatively rigid structure. In other embodiments, other suitable conduits may also or alternatively be employed. The conduit 84 may be any desired length to reach the collection unit 44.

As shown in FIG. 10, the impeller 92 (FIGS. 8-9) of the blower 76 is driven by a belt drive arrangement 132. The illustrated belt drive arrangement 132 includes a first pulley 136 mounted to a spindle 140 of the impeller 92. The first pulley 136 is connected to a second pulley 144 mounted on top of the cutting deck 40 by a belt 148. The second pulley 144 may be part of, for example, the belt drive arrangement 60 (FIG. 4) used to rotate the cutting blades 56. Two idler pulleys 152, 156 are positioned between the first and second pulleys 136, 144 to help guide the belt 148. This arrangement allows the impeller 92 to be driven on one side (e.g., from the first pulley 136 positioned above the blower 76), while cut vegetation enters through blower 76 through an opposite side (e.g., through the inlet 108 formed in the bottom of the blower 76). As shown in FIGS. 1 and 2, a cover 160 is positioned over the belt drive arrangement 132 to help protect the belt drive arrangement 132 from dirt and debris.

Figure 13:
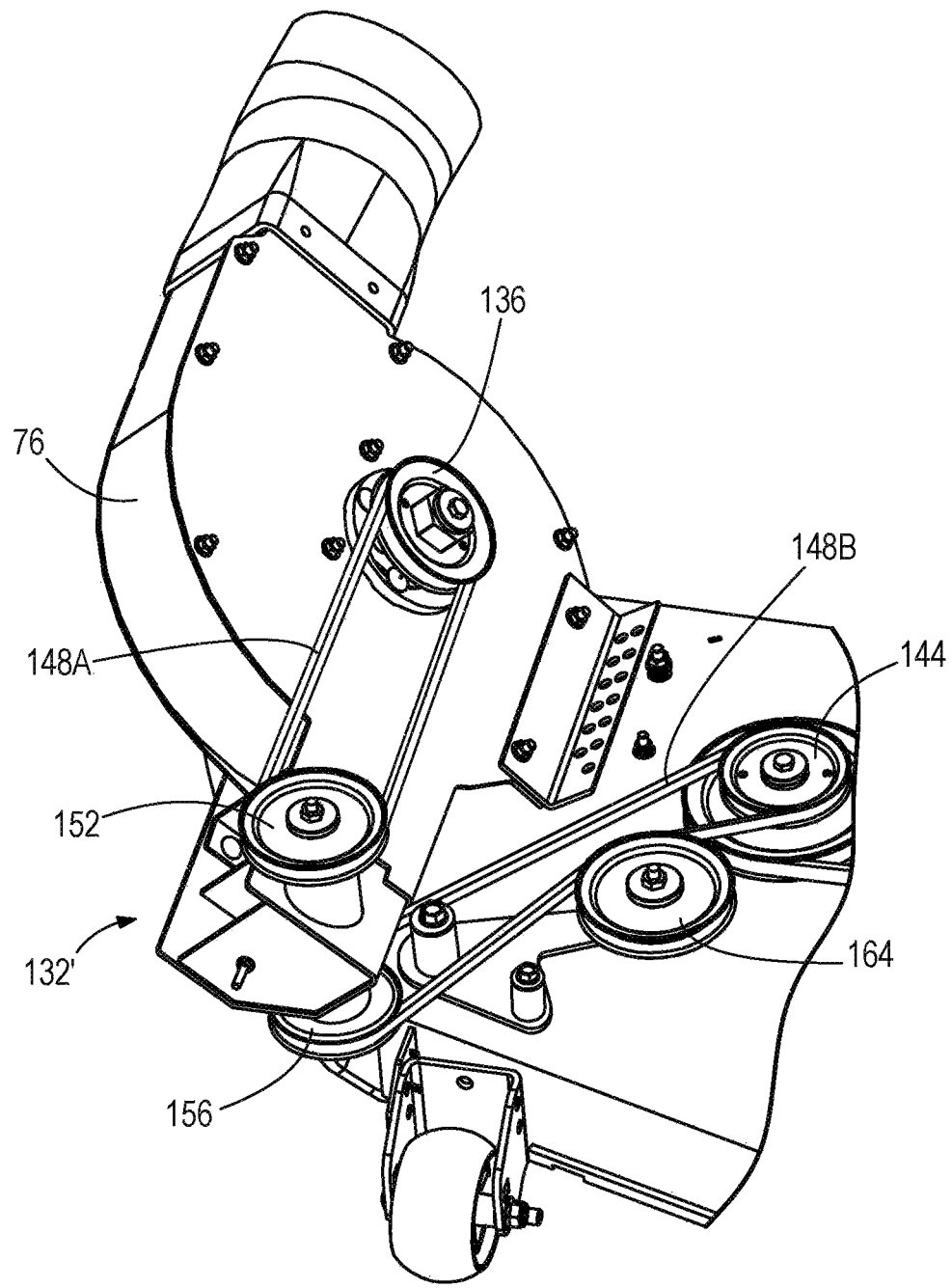
FIG. 13 is a front perspective view of a portion of the lawn mower, illustrating an alternative belt drive arrangement for the blower.
Figure 14:
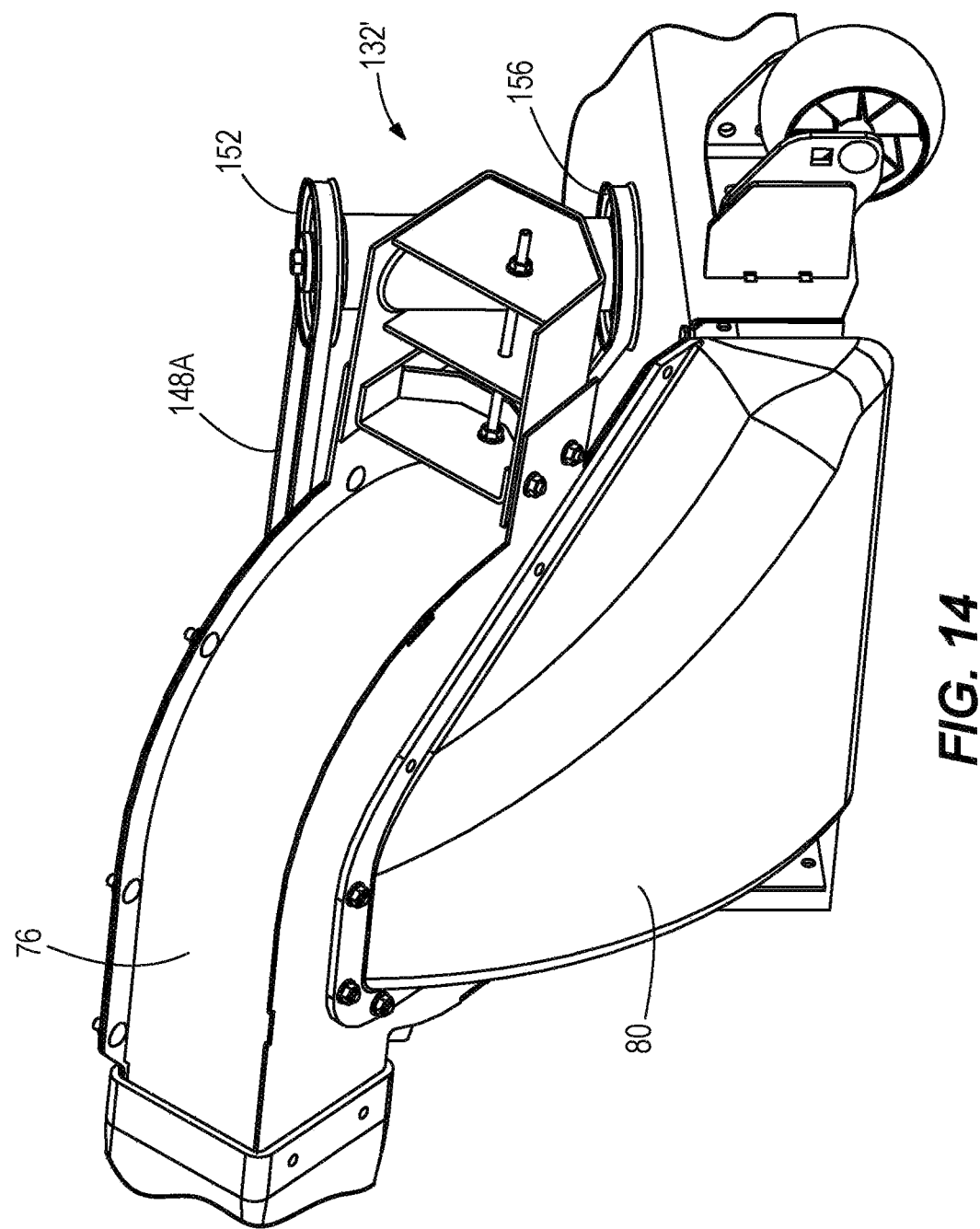
FIG. 14 is side view of the portion of the lawn mower shown in FIG. 13.

An alternative belt drive arrangement 132' for the blower 76 is shown in FIGS. 13-14. In this embodiment, the two secondary pulleys 152, 156 are driven by separate belts 148A, 148B and connected together by a shaft (not shown). More particularly, the first belt 148A extends between the first pulley 136 and one of the secondary pulleys 152, while the second belt 148B extends between the other one of the secondary pulleys 156 and the second pulley 144. A tensioning pulley 164 can help guide the second belt 148B between the second pulley 144 and the secondary pulley 156. When the second pulley 144 is rotated through the belt drive arrangement 60 (FIG. 4), the second belt 148B rotates the secondary pulley 156, which in turn rotates the secondary pulley 152 through the shaft. The secondary pulley 152 rotates the first pulley 136, and thereby the impeller 92, by the first belt 148A.

Figure 11A:
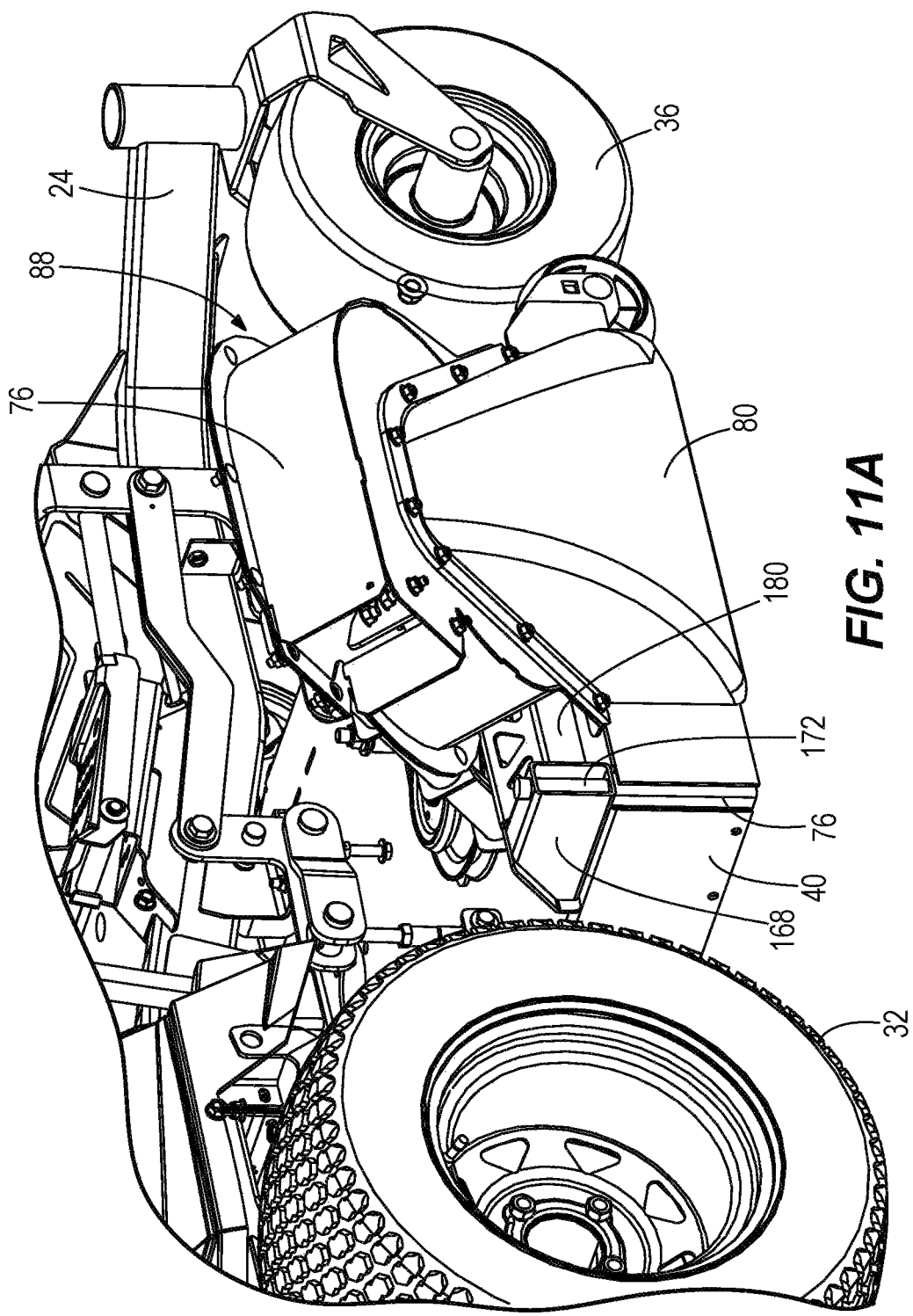
FIG. 11A is a rear perspective view of the portion of the lawn mower shown in FIG. 10.
Figure 11B:
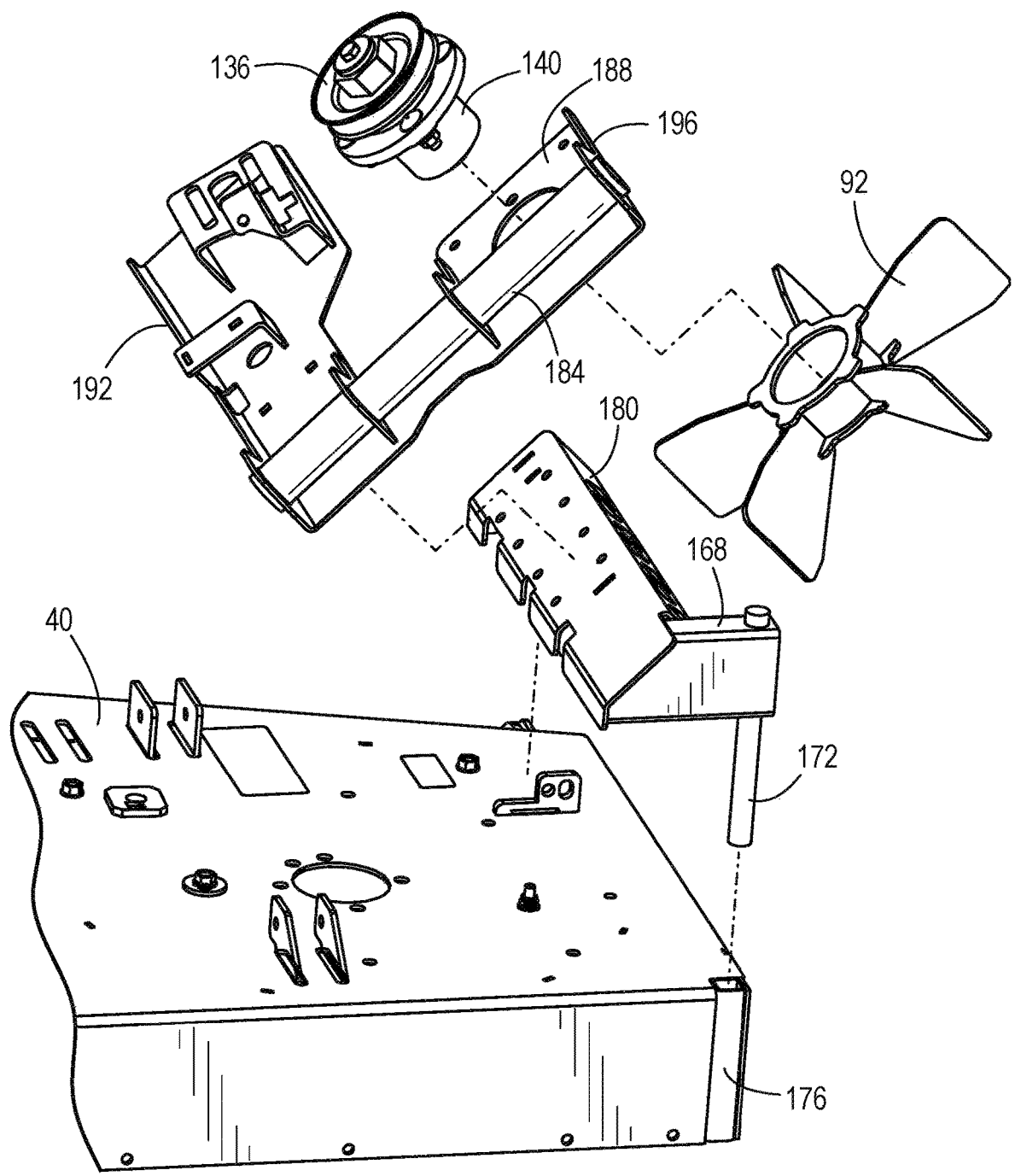
FIG. 11B is an exploded view of a portion of the lawn mower.

Referring back to FIGS. 10-11B, the illustrated impeller 92 of the blower 76 is supported on the cutting deck 40 by a series of brackets. The brackets rigidly connect the impeller 92 to the cutting deck 40, independently of the housing assembly 88. As such, the impeller 92 and the spindle 140 do not rely on the housing assembly 88 for support, and the housing assembly 88 can be made of a relatively lightweight metal or plastic. In some embodiments, the brackets may be steel weldments. In other embodiments, the brackets may be aluminum castings or injection molded hard plastic. In further embodiments, a single bracket could support the impeller 92 on the cutting deck 40.

The illustrated brackets include a first bracket 168 positioned adjacent a rear corner of the cutting deck 40. The first bracket 168 includes a pin or shaft 172 received in a receptacle 176 (FIG. 11B) of the cutting deck 40 to help align the first bracket 168 on the cutting deck 40. The first bracket 168 also includes a rail 180 extending forwardly across the top of the cutting deck 40. A second bracket 188 is coupled to the rail 180 at a first end 192. The second bracket 188 includes a second end 196 that extends upwardly and outwardly from the first end 192, such that the second end 196 is cantilevered away from the cutting deck 40 to a position outside of the vertical footprint of the cutting deck 40. The second bracket 188 is oriented at the same angle as the angle α of the blower 76. A rigid support 184 (e.g., a tube) extends across part of the second bracket 188 to provide additional rigidity to the second bracket 188. The impeller spindle 140 and the first pulley 136 are coupled to an end section of second bracket 188, opposite from the rail 180. The first bracket 168 and the second bracket 188 thereby provide a rigid pathway to support the impeller 92 on the cutting deck 40. The housing assembly 88 of the blower 76 is coupled (e.g., bolted) to the second bracket 188 so that the housing assembly 88 hangs below and is also supported by the brackets.

Figure 12:
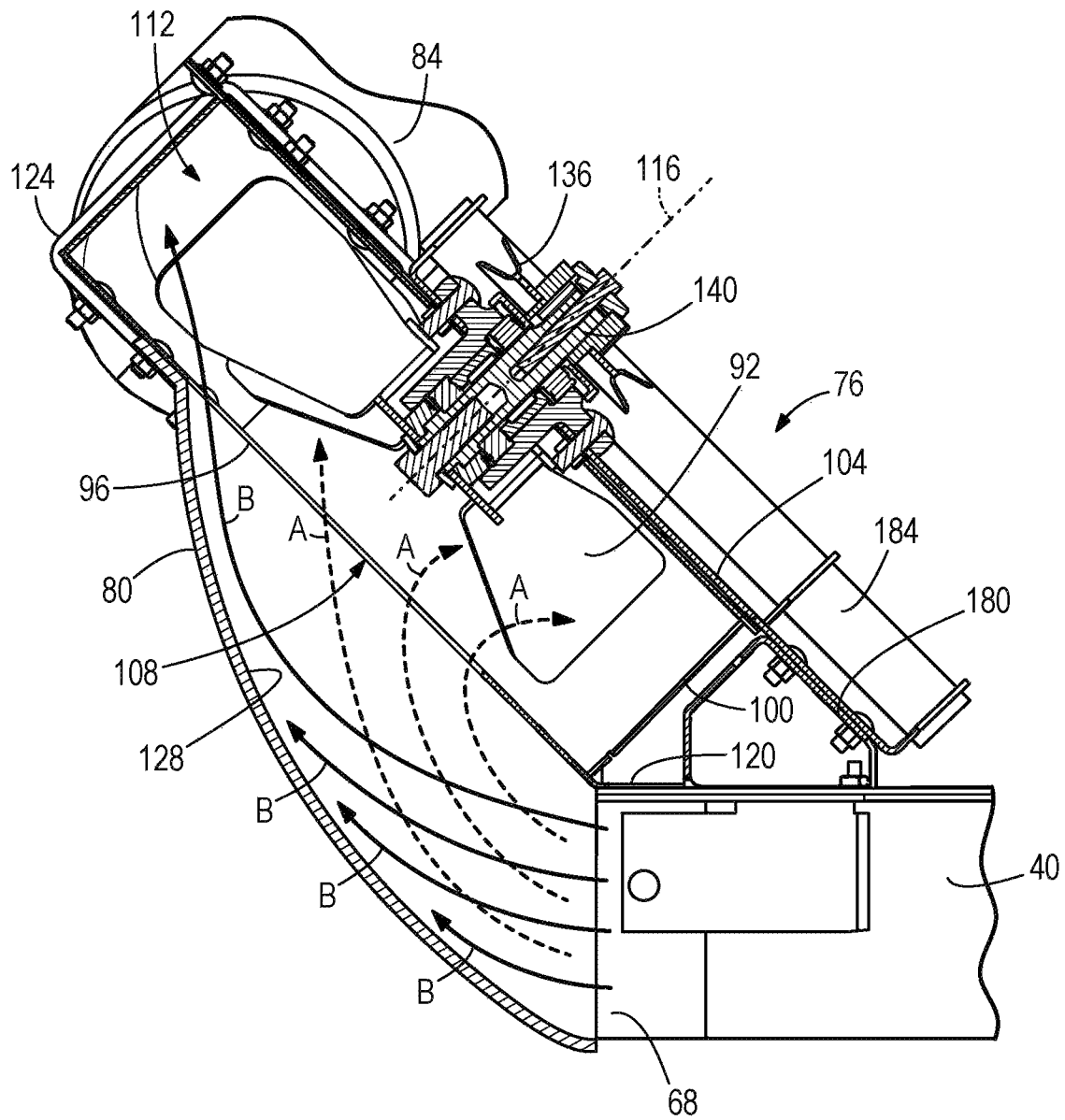
FIG. 12 is a cross-sectional view of a portion of the blower, the cutting deck, and a chute.

Referring to FIG. 12, during operation, vegetation is cut by the cutting blades 56 (FIG. 5) and discharged through the discharge opening 68 of the cutting deck 40. The impeller 92 of the blower 76 is rotated to help draw an airflow (arrows A) and the cut vegetation (arrows B) through the discharge opening 68. The impeller 92 also propels the airflow and the cut vegetation through the conduit 84 to the collection unit 44. The inner surface 128 of the chute 80 is angled relative to an outlet path of the discharge opening 68. As such, a relatively high percentage of the cut vegetation (arrows B) being discharged through the discharge opening 68 is immediately guided out of the blower 76 through the outlet 112 without being circulated by the impeller 92 around the housing assembly 88.

In addition, most of the cut vegetation, and other debris, exits the cutting deck 40 near the front of the discharge opening 68 (in relation to an operator sitting in the seat). As the cut vegetation is directed toward the central opening 108 of the blower 76 by the chute 80, the cut vegetation has a significant rearward component of velocity and is accelerated in the same direction as it enters the housing assembly 88. Such an arrangement requires less work to propel the cut vegetation toward the outlet 112 compared to other blowers where material enters perpendicular to a rotation plane of an impeller, in which case the material may have a zero velocity component in the rearward (discharge) direction.

Tilting the blower 76 relative to the cutting deck 40 provides several advantages over conventional blowers, where the blowers are oriented either horizontally or vertically relative to cutting decks. First, mounting the blower 76 at the inclined angle α reduces the overall width of the cutting deck 40 and the blower 76 compared to horizontally-mounted, central inlet blowers. In addition, mounting the blower 76 at the inclined angle α and providing the central inlet 108 allows the blower 76 to operate more efficiently than conventional offset inlet blowers. The illustrated chute 80 helps guide cut vegetation toward the sidewall 100 near the outlet 112 of the blower 76 so the vegetation is immediately discharged from the blower 76 through the outlet 112 without circulating around the housing assembly 88. Further, the slope of the chute 80 helps pre-separate the cut vegetation from the air flow before the vegetation, or other debris, reaches the blower 76.

Various features and advantages of the invention are set forth in the following claims.

What is claimed is:

1. A lawn mower comprising:
 a frame;
 a prime mover supported by the frame;
 a plurality of wheels rotatably coupled to the frame to support the frame for movement along the ground;
 a cutting deck supported by the frame, the cutting deck having a discharge opening;
 a cutting blade rotatably mounted below the cutting deck and driven by the prime mover, the cutting blade being rotatable within a cutting plane; and
 a blower supported by the cutting deck adjacent the discharge opening to draw cut vegetation from under the cutting deck and discharge the cut vegetation away from the cutting deck, wherein the blower defines an axis of rotation that is perpendicular to a direction of travel of the lawn mower and is obliquely angled relative to the cutting plane.

2. The lawn mower of claim 1, further comprising a chute extending between the discharge opening and the blower.

3. The lawn mower of claim 2, wherein the chute directs an airflow toward a central inlet of the blower.

4. The lawn mower of claim 1, further comprising a collection unit coupled to the frame, wherein the collection unit is configured to collect vegetation cut by the cutting blade.

5. The lawn mower of claim 4, further comprising a conduit extending from the blower to the collection unit to direct the cut vegetation to the collection unit.

6. The lawn mower of claim 1, further comprising a bracket that is mounted to the cutting deck and rigidly supports the blower relative to the cutting deck at the oblique angle.

7. The lawn mower of claim 6, wherein the bracket is a first bracket and the lawn mower further includes a second bracket coupled to the first bracket, wherein the second bracket extends upwardly and outwardly from the first bracket at the same oblique angle as the blower.

8. The lawn mower of claim 1, wherein the blower is obliquely angled relative to the cutting plane by an angle approximately between 15 degrees and 75 degrees.

9. The lawn mower of claim 1, wherein the blower is obliquely angled relative to the cutting plane by an angle of about 45 degrees.

10. The lawn mower of claim 1, wherein the blower includes an impeller rotatably driven about an axis of rotation, wherein the axis of rotation of the impeller is obliquely angled relative to the cutting plane.

11. The lawn mower of claim 10, wherein the blower further includes a housing assembly surrounding the impeller, and wherein the housing assembly is supported by the cutting deck, such that the impeller does not rely on the housing assembly for support.

12. The lawn mower of claim 10, further including a belt drive arrangement having a first pulley mounted to a shaft of the impeller, a second pulley mounted on top of the cutting deck and connected to the first pulley by a belt, and two idler pulleys positioned between the first and second pulleys to help guide the belt, wherein the belt drive arrangement is positioned laterally in-line relative to the blower.

13. A lawn mower comprising:
 a frame;
 a prime mover supported by the frame;
 a plurality of wheels rotatably coupled to the frame to support the frame for movement along the ground;
 a cutting deck supported by the frame, the cutting deck having a discharge opening;
 a cutting blade rotatably mounted below the cutting deck and driven by the prime mover, the cutting blade being rotatable within a cutting plane;
 a bracket having a first end mounted atop the cutting deck and a second end being cantilevered from the cutting deck such that the second end is outside the outer periphery of the cutting deck; and
 a blower positioned adjacent the discharge opening of the cutting deck to draw cut vegetation from under the cutting deck and discharge the cut vegetation away from the cutting deck, the blower including
  an impeller mounted to the second end of the bracket, and
  a housing assembly mounted to the bracket and surrounding the impeller such that the impeller does not rely on the housing assembly for support.

14. The lawn mower of claim 13, further comprising a chute extending between the discharge opening and the blower, wherein the chute forms a ramp therebetween.

15. The lawn mower of claim 14, wherein the chute directs an airflow toward a central inlet of the blower.

16. The lawn mower of claim 13, further comprising a collection unit coupled to the frame, wherein the collection unit is configured to collect vegetation cut by the cutting blade.

17. The lawn mower of claim 16, further comprising a conduit extending from the blower to the collection unit to direct the cut vegetation to the collection unit.

18. The lawn mower of claim 13, wherein the blower is obliquely angled relative to the cutting plane.

19. The lawn mower of claim 13, wherein the blower is obliquely angled relative to the cutting plane by an angle of about 45 degrees.

20. A collection system for use with a lawn mower including a frame, a cutting deck supported by the frame, a discharge opening defined in the cutting deck, and a cutting blade rotatably mounted below the cutting deck, wherein the cutting blade is rotatable within a cutting plane, the collection system comprising:
 a blower configured to be mounted to the cutting deck adjacent the discharge opening, the blower including
  a housing having an inlet and an outlet, and
  an impeller positioned within the housing and defining an axis of rotation about which the impeller rotates, wherein the axis of rotation is configured to be obliquely angle relative to the cutting plane of the cutting blade when the blower is mounted to the cutting deck;
 a collection unit configured to be coupled to the frame, wherein the collection unit is configured to collect vegetation cut by the cutting blade; and
 a conduit extending from the blower to the collection unit to direct the cut vegetation to the collection unit,
 wherein the inlet is a central inlet that is aligned with the axis of rotation of the impeller, and wherein the outlet is offset from the axis of rotation and is tangential to the impeller.

21. The lawn mower of claim 20, further comprising a bracket configured to mount to the cutting deck, wherein the bracket rigidly supports the blower relative to the cutting deck at the oblique angle.

22. The lawn mower of claim 21, wherein the bracket extends upwardly and outwardly at the same oblique angle as the blower.

23. A blower for use with a lawn mower including a frame, a cutting deck supported by the frame, a discharge opening defined in the cutting deck, and a cutting blade rotatably mounted below the cutting deck, wherein the cutting blade is rotatable within a cutting plane, the blower comprising:

a housing having a central inlet and an outlet;
an impeller positioned within the housing and defining an axis of rotation about which the impeller rotates, the axis of rotation being aligned with the central inlet and configured to be oriented at an oblique angle relative to the cutting plane of the cutting blade; and
a bracket configured to mount to the cutting deck, the bracket supporting the impeller at the oblique angle relative to the cutting plane,
wherein the housing surrounds the impeller, and wherein the impeller is supported by the bracket such that the impeller does not rely on the housing for support.

24. The lawn mower of claim 23, further comprising a chute extending between the discharge opening of the cutting deck and the blower, wherein the chute forms a ramp therebetween.

25. The lawn mower of claim 24, wherein the chute directs an airflow toward a central inlet of the blower.

* * * * *